(12) United States Patent
Chong et al.

(10) Patent No.: US 8,964,973 B2
(45) Date of Patent: Feb. 24, 2015

(54) SYSTEMS AND METHODS FOR CONTROLLING FILE EXECUTION FOR INDUSTRIAL CONTROL SYSTEMS

(75) Inventors: Justin Brandon Chong, Salem, VA (US); David Richard Socky, Roanoke, VA (US); Manas Ranjan Sahoo, Hyderabad (IN)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 13/460,801

(22) Filed: Apr. 30, 2012

(65) Prior Publication Data

US 2013/0287208 A1    Oct. 31, 2013

(51) Int. Cl.
*H04L 9/00* (2006.01)
*H04L 9/08* (2006.01)
*H04L 29/06* (2006.01)

(52) U.S. Cl.
CPC .............. *H04L 9/08* (2013.01); *H04L 63/1416* (2013.01)
USPC .......................................................... 380/44

(58) Field of Classification Search
CPC .......... H04L 9/08; H04L 9/30; H04L 63/1416
USPC ........................................ 380/44; 726/22–25
See application file for complete search history.

(56) References Cited

U.S. PATENT DOCUMENTS

| | | | |
|---|---|---|---|
| 5,774,652 | A | 6/1998 | Smith |
| 6,092,202 | A | 7/2000 | Veil et al. |
| 6,449,732 | B1 | 9/2002 | Rasmussen et al. |
| 6,694,434 | B1 * | 2/2004 | McGee et al. ................ 713/189 |
| 6,826,690 | B1 | 11/2004 | Hind et al. |
| 7,222,228 | B1 | 5/2007 | Stephens, Jr. et al. |
| 7,246,002 | B2 | 7/2007 | Healy et al. |
| 7,340,600 | B1 | 3/2008 | Corella |
| 7,412,524 | B1 | 8/2008 | Gupta et al. |
| 7,535,648 | B2 | 5/2009 | Batke et al. |
| 7,577,848 | B2 | 8/2009 | Schwartz et al. |
| 7,649,452 | B2 | 1/2010 | Zilberstein et al. |
| 7,877,627 | B1 | 1/2011 | Freydel |
| 8,015,791 | B2 | 9/2011 | Finkbeiner |
| 8,121,707 | B2 | 2/2012 | Karaffa et al. |

(Continued)

FOREIGN PATENT DOCUMENTS

| | | |
|---|---|---|
| DE | 102008038913 A1 | 2/2010 |
| EP | 0891611 A1 | 1/1999 |

(Continued)

OTHER PUBLICATIONS

U.S. Appl. No. 13/460,721, filed Apr. 30, 2012, Sahoo et al.

(Continued)

*Primary Examiner* — Anthony Brown
(74) *Attorney, Agent, or Firm* — Fletcher Yoder P.C.

(57) ABSTRACT

A system includes a build system processor configured to generate a private encryption key and configured to add the private encryption key to at least one of a plurality of source files. Each of the plurality of source files includes instructions configured to be executed by an industrial controller processor. The processor is also configured to generate a plurality of binary files from the plurality of source files. The processor is further configured to construct a whitelist file including first hash key values determined for the plurality of binary files and configured to encrypt the whitelist file using the private key to provide an encrypted whitelist file.

20 Claims, 3 Drawing Sheets

(56) References Cited

U.S. PATENT DOCUMENTS

| | | | |
|---|---|---|---|
| 8,707,032 B2 | 4/2014 | Socky et al. | |
| 8,726,372 B2 | 5/2014 | Sahoo et al. | |
| 2003/0016819 A1 | 1/2003 | Cheng | |
| 2005/0076203 A1 | 4/2005 | Thornton et al. | |
| 2005/0213768 A1 | 9/2005 | Durham et al. | |
| 2006/0253465 A1 | 11/2006 | Willis et al. | |
| 2006/0285693 A1 | 12/2006 | Raikar | |
| 2007/0162609 A1 | 7/2007 | Pope et al. | |
| 2007/0260116 A1 | 11/2007 | Shigemori et al. | |
| 2008/0163182 A1 | 7/2008 | Breault | |
| 2008/0168564 A1 | 7/2008 | Lerouge et al. | |
| 2008/0175388 A1 | 7/2008 | Okabe et al. | |
| 2009/0049430 A1* | 2/2009 | Pai et al. | 717/140 |
| 2009/0077638 A1 | 3/2009 | Norman et al. | |
| 2009/0083287 A1 | 3/2009 | Bell et al. | |
| 2009/0094250 A1 | 4/2009 | Dhuse et al. | |
| 2009/0169006 A1 | 7/2009 | Zick et al. | |
| 2009/0171479 A1 | 7/2009 | Oosako | |
| 2009/0276550 A1 | 11/2009 | Megarity | |
| 2009/0319773 A1 | 12/2009 | Frenkel et al. | |
| 2009/0328183 A1 | 12/2009 | Frenkel et al. | |
| 2010/0036773 A1 | 2/2010 | Bennett | |
| 2010/0146588 A1 | 6/2010 | Bergerson et al. | |
| 2010/0185857 A1 | 7/2010 | Neitzel et al. | |
| 2010/0192208 A1 | 7/2010 | Mattsson | |
| 2010/0275039 A1 | 10/2010 | Frenkel et al. | |
| 2010/0313264 A1 | 12/2010 | Xie et al. | |
| 2011/0039237 A1 | 2/2011 | Skare | |
| 2011/0299679 A1* | 12/2011 | Yamaguchi et al. | 380/44 |
| 2012/0030761 A1 | 2/2012 | Baba et al. | |
| 2012/0036568 A1 | 2/2012 | Kodama | |
| 2012/0159650 A1 | 6/2012 | Cho et al. | |
| 2012/0198541 A1 | 8/2012 | Reeves | |
| 2012/0226917 A1 | 9/2012 | Wiseman et al. | |
| 2012/0240212 A1 | 9/2012 | Wood et al. | |
| 2012/0246455 A1 | 9/2012 | Masten | |
| 2013/0030765 A1 | 1/2013 | David | |
| 2013/0067551 A1 | 3/2013 | Frew et al. | |
| 2013/0110298 A1 | 5/2013 | Beveridge | |
| 2013/0139242 A1 | 5/2013 | Zhu | |
| 2013/0287208 A1 | 10/2013 | Chong et al. | |
| 2013/0290729 A1 | 10/2013 | Pettigrew et al. | |
| 2013/0291085 A1 | 10/2013 | Chong et al. | |
| 2013/0291115 A1 | 10/2013 | Chong et al. | |

FOREIGN PATENT DOCUMENTS

| | | |
|---|---|---|
| EP | 0891611 B1 | 1/1999 |
| EP | 1608123 A1 | 12/2005 |
| JP | 2005100164 | 4/2005 |
| JP | 2007061191 | 3/2007 |
| JP | 2008283789 | 11/2008 |
| JP | 2008283792 | 11/2008 |
| JP | 2008284160 | 11/2008 |
| WO | 2005069823 A2 | 8/2005 |

OTHER PUBLICATIONS

U.S. Appl. No. 13/460,759, filed Apr. 30, 2012, Socky et al.
U.S. Appl. No. 13/460,794, filed Apr. 30, 2012, Chong et al.
U.S. Appl. No. 13/460,779, filed Apr. 30, 2012, Chong et al.
U.S. Appl. No. 13/460,771, filed Apr. 30, 2012, Pettigrew et al.
Simon et al., RFC 5216: The EAP-TLS Authentication Protocol, Mar. 2008, IETF, pp. 1-34.
Farrell et al., RFC 5755: An Internet Attribute Certificate Profile for Authorization, Jan. 2010, IETF, pp. 1-50.
Okhravi, Hamed; "Data Diodes in Support of Trustworthy Cyber Infrastructure"; Apr. 21-23; Oak Ridge; Tennessee; USA Copyright 2010; pp. 1-4; ACM 978-1-4503-0017-9.
Dierks, T., et al., "The Transport Layer Security (TLS) Protocol Version 1.2; rfc5246.txt", Aug. 1, 2008, pp. 1-104, Switzerland.
Freier, A., et al., "The Secure Sockets Layer (SSL) Protocol Version 3.0; rfc6101.txt," Aug. 13, 2011, pp. 1-67, Switzerland.
Ball, E., et al., "Role-based access control with X.509 attribute certificates," IEEE Internet Computing, Mar. 1, 2003, pp. 62-69, vol. No. 7, Issue No. 2, United States.
Cooper, D., et al., "Internet X.509 Public Key Infrastructure Certificate and Certificate Revocation List (CRL) Profile; rfc5280.txt", May 1, 2008, pp. 1-151.
PCT Search Report and Written Opinion dated Dec. 12, 2013, issued in connection with corresponding WO Application No. PCT/US2013/062522.

* cited by examiner

SYSTEMS AND METHODS FOR CONTROLLING FILE EXECUTION FOR INDUSTRIAL CONTROL SYSTEMS

BACKGROUND OF THE INVENTION

The subject matter disclosed herein relates to industrial control systems and, more particularly, to securing the operation of industrial control systems.

Industrial control systems, such as automated power generation systems (e.g., wind, water, and gas turbine systems) and automated manufacturing systems (e.g., petroleum refineries, chemical manufacturing plants, and the like) are a common feature of modern industry. For such industrial control systems, an industrial controller may generally control the operation of the system. For example, certain devices in the industrial control system (e.g., sensors, pumps, valves, actuators, and the like) may be controlled by, and may report data to, the industrial controller. Furthermore, the industrial controller may execute instructions (e.g., firmware and/or applications) that may generally enable the industrial controller to control the operation of the industrial control system (e.g., a gas turbine system). These instructions may be provided by the manufacturer of the industrial controller. For example, these instructions may be loaded onto the industrial controller before it is installed in the industrial control system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a build system processor configured to generate a private encryption key and configured to add the private encryption key to at least one of a plurality of source files. Each of the plurality of source files includes instructions configured to be executed by an industrial controller processor. The processor is also configured to generate a plurality of binary files from the plurality of source files. The processor is further configured to construct a whitelist file including first hash key values determined for the plurality of binary files and configured to encrypt the whitelist file using the private key to provide an encrypted whitelist file.

In another embodiment, a method includes generating a private key and generating a plurality of executable files. The plurality of executable files includes instructions to be executed by an industrial controller. The method includes determining a first hash key value for each of the plurality of executable files. The method further includes generating a whitelist file including the first hash key value for each of the plurality of executable files and encrypting the whitelist file using the private key to provide an encrypted whitelist file.

In a third embodiment, a tangible, non-transitory, computer-readable medium includes instructions configured to be executed by a processor of an industrial controller. The instructions include instructions to determine an encryption key value from a plurality of binary files and instructions to use the encryption key to decrypt a whitelist file. The whitelist file includes a plurality of whitelisted hash key values that each correspond to a respective one of the plurality of binary files. The instructions also include instructions to determine a hash key value for a particular binary file of the plurality of binary files. The instructions further include instructions to block execution of the particular binary file when the determined hash key value is not located among the plurality of whitelisted hash key values.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Additionally, as used herein, the terms "executable file" and "binary file" may both generally refer to a computer-readable file that that includes instructions (e.g., binary instructions) that may be performed by a processor (e.g., the processor of an industrial controller). Furthermore, as used herein, the term "software developer" may generally refer to an organization which develops, maintains, and/or provides instructions in the form of source code and/or executable files to control the operation of industrial controllers. Also, as used herein, the term "whitelist" may refer to a file which includes a list identifying executable files that are authorized to run on an industrial controller. Additionally, the term "authorized" may be used herein to refer to an executable file that is verified to be from a trustworthy source (i.e., the software developer) and whose contents are verified as being the same as when it was provided by the trustworthy source.

As mentioned above, an industrial controller may generally execute instructions (e.g., base code, firmware, and/or applications stored in the form of one or more executable files) that may enable the industrial controller to control the operation of an industrial control system. These instructions may be initially loaded onto the industrial controller (e.g., into a memory or data storage component of the industrial controller) by the manufacturer before it is supplied to a customer. These instructions (e.g., base code, firmware, and/or applications) may also be subsequently updated (e.g., by the hardware manufacturer) and provided to the customer so that the instructions stored on the industrial controller may be updated to augment functionality and/or to fix errors or bugs in the instructions. Once the instructions in the memory of the industrial controller have been updated, then the industrial controller may execute these updated instructions to control the operation of the industrial control system.

However, under certain circumstances, it may be desirable for the industrial controller to verify that each executable file storing instructions for the industrial controller is authorized prior to execution. That is, it may be desirable to ensure that, prior to execution, each executable or binary file storing instructions for the industrial controller is verified as being provided from a trustworthy or reputable source (e.g., the software developer). Furthermore, it may be desirable to verify that each executable or binary file has not been altered since it was prepared by this trustworthy source (e.g., in transit between the hardware manufacturer and the customer). Moreover, it may be desirable to be able to perform this verification of executable files quickly and using limited resources (e.g., memory space and processor time), so as not to otherwise disrupt the operations of the industrial controller.

Accordingly, the presently disclosed systems and methods enable the verification of both the identity and the contents of each of the executable files before they are executed by the industrial controller in an efficient manner using a whitelisting system. That is, as discussed in detail below, presently disclosed embodiments utilize a secure whitelist file that may be provided by the software developer along with each release of executable files (e.g., each software installation or update release). This whitelist file generally includes a number of values, and each of these values may be associated with an authorized executable file. By verifying that each executable has an associated entry in the whitelist prior to execution, the presently disclosed embodiments provide the industrial controller with improved security to block or prevent the execution of undesired and/or malicious instructions (i.e., instructions from a non-trustworthy source).

As discussed in detail below, the presently disclosed whitelist file includes a collection of hash key values for the authorized executable files in a particular software release. That is, after each executable file is built, the executable file may be provided as input to a hash function and the hash key value output associated with that executable may be stored in the whitelist. Furthermore, the whitelist may be securely provided to the industrial controller (e.g., encrypted prior to packaging and/or transport and decryption by the industrial controller). The industrial controller, prior to executing a particular executable file may also provide the particular executable file to the same hash function (e.g., CRC, MD5, SHA-1, or other hash function) and may search the whitelist to determine if the hash key value output from the hash function is listed in the whitelist. If the hash key value is located in the whitelist, the industrial controller may conclude that the particular executable file is authorized (e.g., from a trustworthy source and unaltered since it was built) and proceed with executing the file. If, however, the hash key value is not located in the whitelist, the industrial controller may block the execution of the particular executable file.

Figure 1:
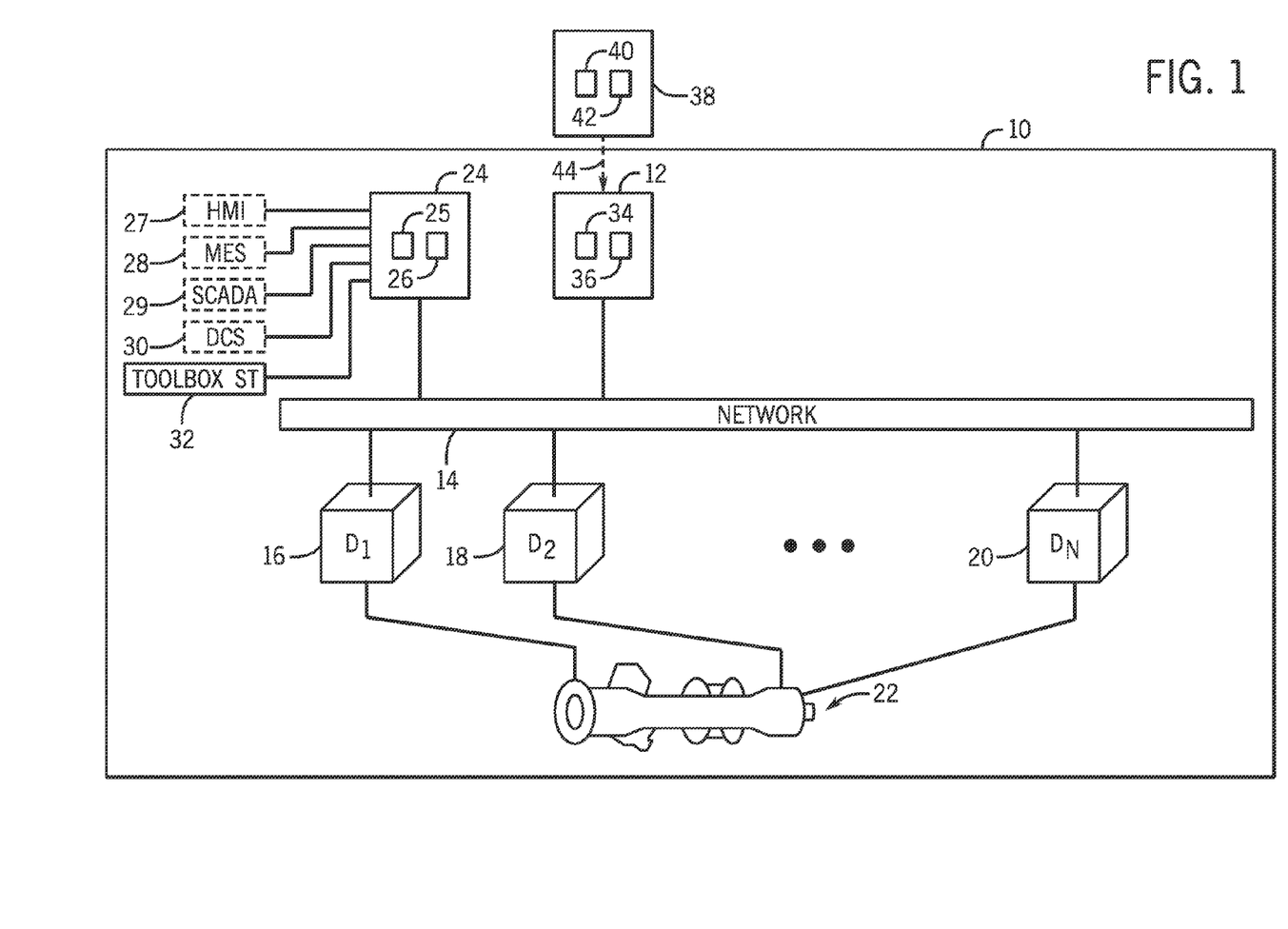
FIG. 1 is a schematic diagram of an embodiment of an industrial control system and a build system, in accordance with aspects of the present disclosure.

With the foregoing in mind, FIG. 1 is a schematic diagram illustrating an industrial control system 10. The illustrated industrial control system 10 includes an industrial controller 12 that may be coupled to a network 14 to control the operation of a number of field devices 16, 18 and 20. For example, the illustrated industrial controller 12 receives sensory data from a number of field devices 16, 18, and 20 (e.g., temperature sensors, pressure sensors, voltage sensors, control valves, actuators, or similar field devices for an industrial control system) via the network 14 to monitor and control the operation of a gas turbine system 22. In other embodiments, rather than a gas turbine system 22, the system being monitored and controlled by the industrial control system 10 may include, for example, any automated manufacturing systems (e.g., petroleum refinery systems, chemical production systems, or other automated manufacturing system) or automated power generation systems (e.g., power plants, steam turbine systems, wind turbine systems, gasification systems, and similar automated power generation systems). For example, in an embodiment, a gasification system may include a gasifier configured to gasify a carbonaceous feedstock to generate a synthetic gas, a gas treatment unit is configured to process the synthetic gas to remove undesirable elements (e.g., acid gases), a combustor configured to combust the synthetic gas to drive a turbine, and a generator coupled to the turbine configured to produce electrical power. In such an embodiment, the industrial controller 12 may monitor and control the various components of the gasification system (e.g., the gasifier, gas treatment unit, combustor, and turbine) using the field devices 16, 18, and 20.

For the illustrated industrial control system 10, the field devices 16, 18, and 20 are be communicatively coupled to the industrial controller 12 (e.g., via the network 14) while monitoring and controlling various aspects and parameters of the operation of the gas turbine system 22 (e.g., monitoring the temperature in a combustor of the gas turbine system, controlling the voltage output of an electrical generator coupled to a shaft of the gas turbine system, regulating a flow of a fuel into the combustor, controlling a valve to regulate a gas flow to a gas processor, controlling a steam input of a heat recovery steam generator (HRSG), and the like). It should be appreciated that the illustrated industrial control system 10 represent a simplified industrial control system, and that other industrial control systems may include any suitable number of industrial controllers 12, networks 14, networking devices, field devices, etc., to monitor and control various portions of any automated system 22.

In the depicted embodiment, industrial controller 12 may use the network 14 for communicating with and controlling any one of the field devices 16, 18, or 20. For example, the industrial controller 12 may reside in an industrial plant and may be configured to adjust one or more process conditions related to the devices 16, 18, 20. The network 14 may be any electronic and/or wireless network suitable for enabling communications, and may include fiber media, twisted pair cable media, wireless communications hardware, Ethernet cable media (e.g., Cat-5, Cat-7), and the like. Further, the network 14 may include several sub-buses, such as a high speed Ethernet sub-bus suitable for connecting components of the industrial control system 10 at communication speeds of 100 MB/sec and upwards. Additionally, the network 14 may include an input/output (I/O) network, such as an I/O network conforming to the Institute of Electrical and Electronics Engineers (IEEE) 802.3 standard. The network 14 may also include an H1 network sub-bus suitable for connecting components of the industrial control system 10 at communications speeds of approximately 31.25 Kb/sec. The sub-buses may intercommunicate with each other, for example, by using linking devices or gateways, such as those gateways available under the designation FG-100 provided by softing AG, of Haar, Germany, and/or I/O packs available from General Electric Co. of Schenectady, N.Y. Indeed, a number of interconnected sub-buses of the network 14 may be used to communicate amongst the components of the industrial control system 10.

The industrial controller 12 includes memory 34 and processor 36 that may execute instructions (e.g., binary instructions in executable files) to generally control the operation of the industrial control system 10. For example, the memory 34 of the industrial controller 12 may include one or more files including binary instructions that may be performed by the processor 36 in order to control and monitor the field devices 16, 18, and 20 disposed within portions of the gas turbine system 22. These executable file may, for example, be initially installed in the memory 34 of the industrial controller 12 by the manufacturer of the industrial controller 12 before the industrial controller 12 is installed in the industrial control system 10. Furthermore, as discussed in detail below, the executable files stored in the memory 34 of the industrial controller 12 may occasionally be updated, for example, to augment the features of previous software versions as well as improve performance.

Also communicatively coupled to the industrial controller 12 (e.g., via the network 14 or another suitable network) is the device 24, having a memory 25 and a processor 26, which may host a human machine interface (HMI) system 27, a manufacturing execution system (MES) 28, a supervisor control and data acquisition (SCADA) system 29, a distributed control system (DCS) 30, or similar interface systems. In particular, in certain embodiments, the device 24 may host a configuration application or tool, such as ToolboxST™ (represented by element 32), available from General Electric Co., of Schenectady, N.Y. In general, the aforementioned systems may provide one or more interfaces by which a user may monitor and control the operation of the industrial controller 12. For example, the HMI 27 and/or the ToolboxST 32 may provide a user interface through which various parameters of the industrial control system 10 (e.g., stored in the memory 34 of the industrial controller 12) may be forced or set. By further example, as discussed in detail below, the HMI 27 and/or the ToolboxST 32 may include an interface through which the various executable files stored in the memory 34 of the controller 12 may be updated to newer versions. In certain embodiments, the aforementioned systems may be hosted on a single device 24, while, in other embodiments, they may each be installed on one or more devices in the industrial control system 10.

As mentioned above, the memory 34 of the industrial controller 12 generally stores a number of executable files (e.g., binary files) to be executed by the processor 36. Also mentioned, the executable files stored in the memory 34 of the industrial controller 12 may occasionally be updated. For example, a software developer may produce and/or provide software updates for the executable files used by the industrial controller 12. For example, the software developer may have a build system 38 (e.g., a computer, laptop, or similar computing device), having a memory 40 and a processor 42, that may be used to build the executable files for later execution by the industrial controller 12 (e.g., once loaded into the memory 34 of the industrial controller 12), such as at the time of manufacturing or during a software update, as discussed below. That is, the memory 40 of the build system 38 may include a number of source files that may contain instructions in the form of human-readable code in a computer programming language. In order to produce an updated version of the executable files, the software developer may use the processor 42 compile these source files, translating them into computer-readable (e.g., binary) instructions in the form of executable files for later execution by the processor 36 of the industrial controller 12. Additionally, in certain embodiments, once the executable files have been created, they may be packaged together (e.g., placed in an archive, compressed, encrypted, and the like). Then, the software developer may provide the updated executable files to the industrial controller 12, as represented by the dashed line 44 of FIG. 1. In certain embodiments, the software developer may place the updated executable files on a physical medium (e.g., an optical disc, a magnetic medium, a flash drive, or other similar data storage medium) that may be provided to (e.g., mailed to) a user of device 24. This user may, in turn, utilize the HMI 27 and/or ToolboxST 32 to transfer the contents of the physical medium to the memory 34 of the industrial controller 12. In other embodiments, the device 24 may, for example, be capable of establishing a network connection to build system 38 in order to download the executable files from the memory 40 of the remote build system 38 of the software developer.

Accordingly, as stated above, it may generally be desirable to ensure that the industrial controller 12 only executes authorized executable files. That is, regardless of how the executable files are provided by the software developer (e.g., via physical medium or network connection), it would be beneficial to verify that the executable file has been in no way modified since it was compiled by the software developer (e.g., the processor 42 of the build system 38 of the software developer). As such, the presently disclosed embodiments utilize a whitelist file that is provided by the software developer along with the executable files as a way of verifying that all of the executable files are authorized prior to execution. As discussed in detail below with respect to FIGS. 2 and 3, the whitelist file contains hash key values for each of the executable files such that the industrial controller 12 may efficiently and simultaneously verify the identity and contents of each executable file prior to execution.

Figure 2:
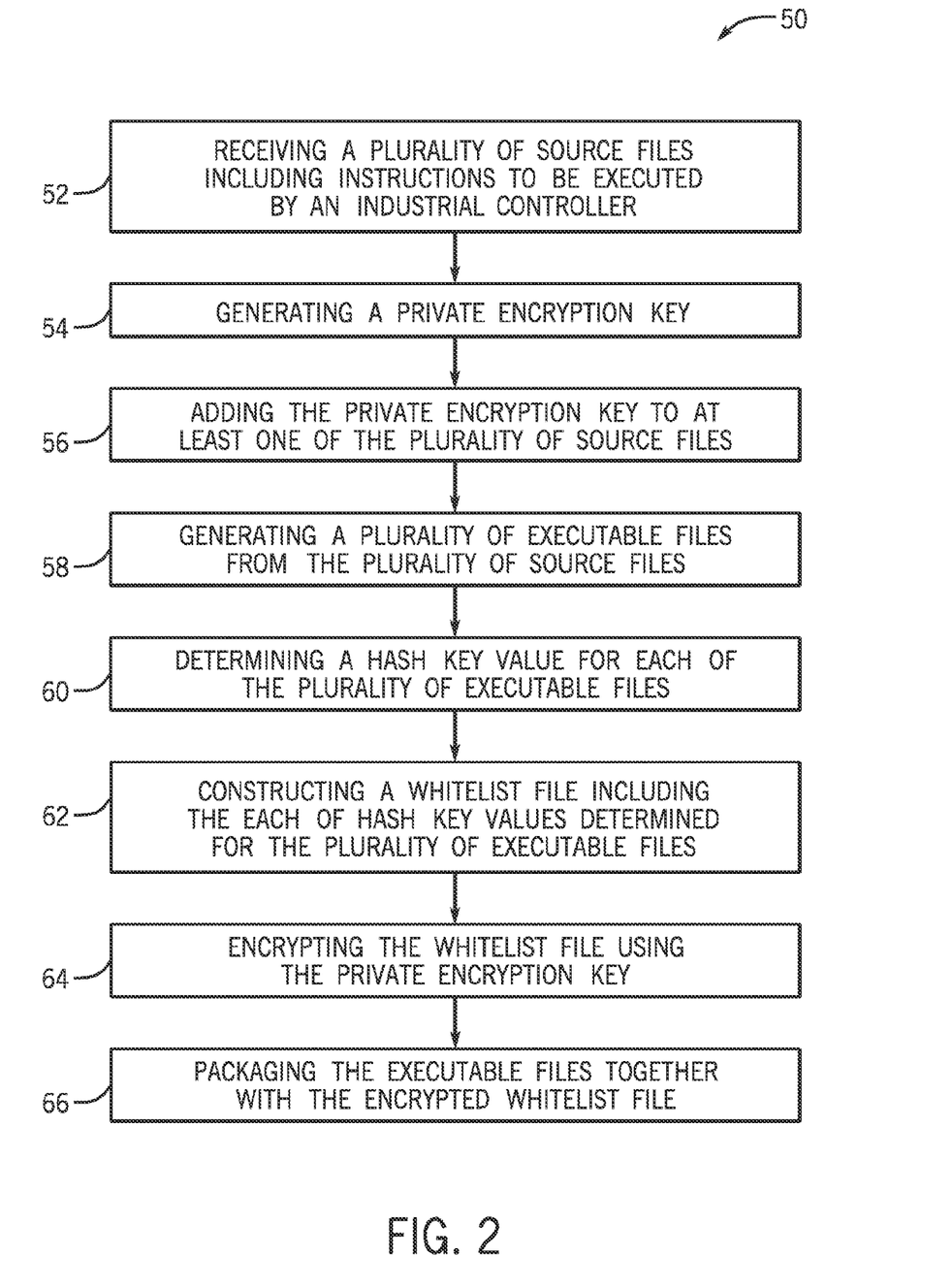
FIG. 2 is a flow diagram for an embodiment of a process by which the build system builds the executable files and whitelist for later use by the industrial controller, in accordance with aspects of the present disclosure.

FIG. 2 illustrates a flow diagram of a process 50 by which a device (e.g., the processor 42 of the build system 38) may prepare a software package including executable files and a whitelist identifying authorized executable files for the industrial controller 12. The illustrated process 50 begins with the build system 38 receiving (block 52) a plurality of source files that include instructions to be later executed by the processor 36 of the industrial controller 12. Next, the processor 42 of the build system 38 may generate (block 54) a private encryption key. In certain embodiments, the processor 42 may utilize one or more algorithms to produce random or pseudo-random characters or values for this private encryption key. In other embodiments, the build system 38 may include one or more random number generating devices that may be used to generate random or pseudo-random characters or values for the private encryption key. Once the private encryption key has been generated, the processor 42 may add (block 56) this private encryption key to at least one of the plurality of source files. For example, a source file associated with a startup executable file (e.g., an executable file that may usually run first when the industrial controller 12 is started) may include a variable that is defined but whose value is not initially specified by the software developer. Accordingly, the processor 42 may edit the source file such that the value of the variable is defined to be the private encryption key. By doing so, as discussed in detail below with respect to FIG. 3, when the industrial controller 12 executes the executable file that was compiled from this edited source file, the industrial controller 12 may have the variable set to the private encryption key (e.g., in order to later decrypt the whitelist file).

Next, the processor 42 of the build system 38 may generate a plurality of executable files from the plurality of source files. That is, the processor 42 may compile the source files in memory 40 of the build system 38 in order to output a number of executable files, which may also be stored in memory 40 of the build system. The processor 42 may then determine a hash key value for each of the plurality of executable files. That is, the processor 42 may apply a hash function to each of the executable files in order to determine a hash key value. A non-limiting list of example hash functions include: Cyclic Redundancy Check (CRC) 32, CRC 64, Message-Digest Algorithm (MD) 5, MD 6, Secure Hash Algorithm (SHA) 1, SHA 2, SHA 256, or SHA 512. It should be appreciated that the hash key value uniquely identifies an executable file based on a digestion of the contents of the executable file. This means that even a single bit change in the content of the executable file (e.g., caused by an error or corruption during transmission over a network connection) may produce a significantly different hash key value. It should also be appreciated that it may be substantially difficult or impossible to intentionally or accidentally produce two different executable files that will produce the same hash key value. As such, it should be appreciated that this essentially enables a processor (e.g., the processor 34 of the industrial controller 12) to quickly verify both the identity and the contents of an executable file by comparing hash key values.

Next, the processor 42 may construct (block 62) a whitelist file including each of the hash key values determined for the plurality of executable files. For example, the processor 42 may create a new file and populate the file with a delimited list of the determined hash key values for the executable files previously compiled by the processor 42. In certain embodiments, the whitelist file may be constructed as an Extensible Markup Language (XML) file. Once the whitelist file has been created, the processor 42 may then encrypt (block 64) the constructed whitelist file using the private encryption key determined in block 54. For example, the processor 42 may use an Advanced Encryption Standard (AES) algorithm, a Data Encryption Standard (DES) algorithm, Pretty good privacy (PGP) algorithm, or other suitable data encryption algorithm. Then, in certain embodiments, the processor 42 may package (block 66) the executable files together with the encrypted whitelist file. That is, the processor 42 may combine the executable file and the encrypted whitelist file into a single archive or compressed file for distribution to the industrial controller 12. In other embodiments, the build system 38 may make the whitelist file available to the industrial controller 12 and/or device 24 for eventual use by the processor 36 of the industrial controller 12.

Figure 3:
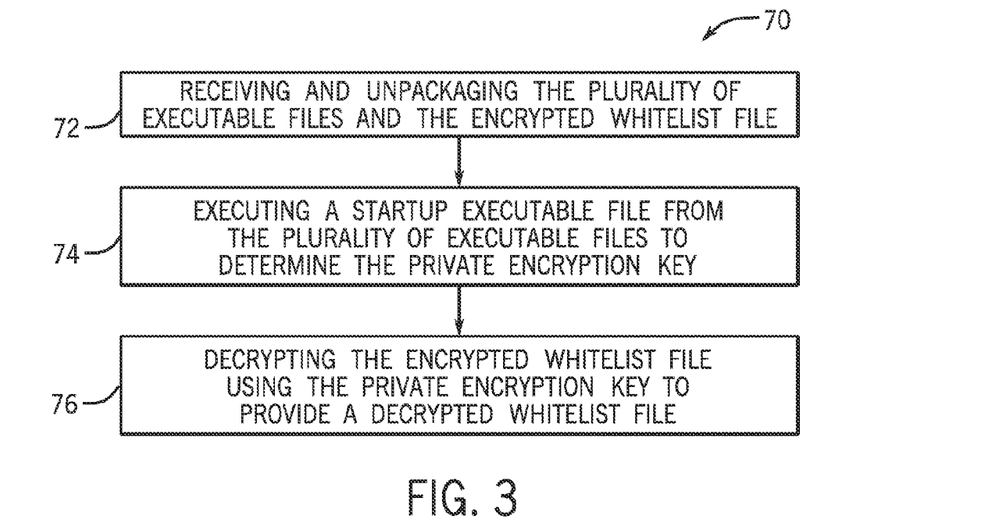
FIG. 3 is a flow diagram for an embodiment of a process by which the industrial controller receives and decrypts the whitelist, in accordance with aspects of the present disclosure.

FIG. 3 illustrates a flow diagram for an embodiment of a process 70 by which a processor 36 of the industrial controller 12 receives and decrypts the whitelist file. The process 70 may begin with the processor 36 of the industrial controller 12 receiving and unpackaging (block 72) the plurality of executable files and the encrypted whitelist file. As mentioned above, the HMI 27 and/or ToolboxST application 32 of the device 24 may assist the industrial controller 12 in receiving and/or unpackaging the plurality of executable files from the software developer (e.g., from build system 38 via physical medium or a network connection). The process 70 continues with the processor 36 of the industrial controller 12 executing (block 74) a startup executable file which may include the private encryption key, as discussed in blocks 64 and 54 of FIG. 2. Next, the processor 36 of the industrial controller 12 may decrypt (block 76) the encrypted whitelist file using the private encryption key in order to provide a decrypted whitelist file (e.g., in the memory 34 of the industrial controller 12). It should be appreciated that, while the actions described in block 72 may generally only be performed during an update of the industrial controller 12, in certain embodiments, the actions described in blocks 74 and 76 may also be performed, for example, during reboots of the industrial controller 12.

Figure 4:
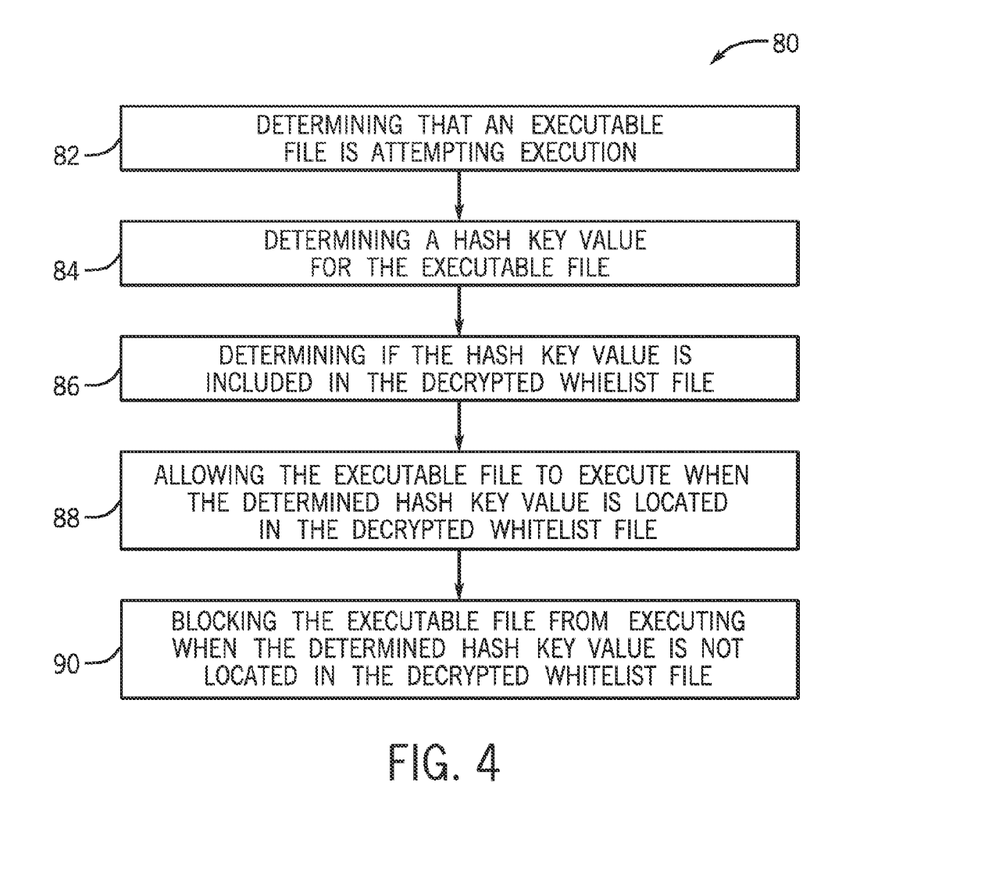
FIG. 4 is a flow diagram for an embodiment of a process by which the industrial controller uses the decrypted whitelist to verify an executable file prior to execution, in accordance with aspects of the present disclosure.

FIG. 4 illustrates a flow diagram for an embodiment of a process 80 by which a processor 36 of the industrial controller 12 may use the whitelist to verify that an executable file is authorized prior to execution. The process 80 begins with the processor 36 determining (block 82) that a particular executable file is attempting execution. The processor 36 may then determine (block 84) a hash key value for the executable file that is attempting execution. It should be appreciated that the processor 36 will apply the same hash function as was used to determine the hash key values during the construction of the whitelist file (e.g., discussed in block 60 of FIG. 2). The process 80 continues with the processor 36 determining (block 86) if the hash key value is included within the decrypted whitelist file (e.g., the decrypted whitelist file discussed with respect to block 76 of FIG. 3). For example, in certain embodiments, the decrypted whitelist file discussed in block 76 of FIG. 3 may be loaded into the memory 34 of the industrial controller 12 as a particular data structure, such as a hash table, which may enable fast and/or efficient searching when determining if a particular hash key value is present in the whitelist. Then, the processor 36 may allow (block 88) the executable file to execute when or if the hash key determined for the executable file is located in the decrypted whitelist file. However, the process 80 may also terminate with the processor 36 blocking (block 90) the execution of the executable file if the hash key value for the executable file is not located in the decrypted whitelist file. In certain embodiments, the processor 36 may further log (e.g., the blocked execution of the executable file as a potential security concern).

The technical effects of this disclosure include improving the security of an industrial controller of an industrial control system. That is, presently disclosed embodiments enable a processor 36 of the industrial controller 12 to verify that each executable file is authorized prior to execution. In particular, by using hash key values for the verification process of the executable files the presently disclosed embodiments provide a light-weight system, enabling the processor 36 of the industrial controller 12 to perform this verification process with minimal impact on resources (e.g., memory space and/or processing time). Furthermore, through the use of hash key values, presently disclosed embodiments provide verification of both the content and the identity of the executable files such that even a single bit change (e.g., due to a transmission error, file corruption, or file tampering) in the executable file would easily be detected. Accordingly, the presently disclosed embodiments provide a robust system for the detection and the blocking of unauthorized executable files from execution.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a build system processor configured to:
   generate a private encryption key;
   embed the private encryption key in at least one of a plurality of source files, wherein each of the plurality of source files comprises instructions configured to be executed by an industrial controller processor of an industrial controller;
   generate a plurality of binary files from the plurality of source files, wherein at least one of the plurality of binary files includes the private encryption key;
   construct a whitelist file comprising a plurality of hash key values respectively determined for the plurality of binary files; and
   encrypt the whitelist file using the private key to provide an encrypted whitelist file.

2. The system of claim 1, wherein the build system processor is configured to provide the plurality of binary files and the encrypted whitelist file to the industrial controller.

3. The system of claim 1, comprising the industrial controller having the industrial controller processor configured to:
   execute a binary startup executable file of the plurality of binary files acquired from the build system processor to determine the private encryption key;
   decrypt the encrypted whitelist file using the determined private encryption key to provide the whitelist file;
   determine a particular hash key value for a particular binary file of the plurality of binary files, wherein the particular binary file is attempting execution; and
   allow the particular binary file to execute when the particular hash key value matches one of the plurality of hash key values located in the whitelist file.

4. The system of claim 3, wherein the industrial controller processor is configured to download the plurality of binary files and the encrypted whitelist file from the build system processor via a network connection or from a data storage medium.

5. The system of claim 3, wherein the industrial controller processor is configured to block the particular binary file from executing on the industrial controller when the particular hash key value determined for the particular binary file does not match one of the plurality of hash key values located in the whitelist file.

6. The system of claim 1, wherein the whitelist file has an extensible markup language (XML) format.

7. The system of claim 1, wherein the industrial controller is configured to control an industrial system comprising a gasification system, a gas treatment system, a turbine system, a power generation system, a heat recovery steam generation (HRSG) system, or a combination thereof.

8. A method, comprising:
   generating a plurality of executable files from a plurality of source files, wherein the plurality of executable files comprise instructions to be executed by an industrial controller, and wherein the plurality of executable files include a private key that is embedded in at least one of the plurality of source files;
   determining a respective hash key value for each of the plurality of executable files;
   generating a whitelist file comprising the hash key values for each of the plurality of executable files; and
   encrypting the whitelist file using the private key to provide an encrypted whitelist file.

9. The method of claim 8, comprising packaging the plurality of executable files together with the encrypted whitelist file to provide a package.

10. The method of claim 9, comprising encrypting the package before providing the package to the industrial controller.

11. The method of claim 8, comprising:
    receiving the encrypted whitelist file and the plurality of executable files at the industrial controller;
    execute one of the plurality of executable files received to determine the private encryption key;
    decrypting the received encrypted whitelist file using the private key to provide the whitelist file;
    determining a particular hash key value for a particular executable file of the plurality of executable files; and
    allowing the particular executable file to execute on the industrial controller when the particular hash key value determined for the particular executable matches one of the hash key values in the whitelist file.

12. The method of claim 11, comprising:
    blocking the particular executable file from executing on the industrial controller when the particular hash key value determined for the particular executable does not match one of the hash key values in the decrypted whitelist file; and
    logging information relating to the particular executable file blocked from executing on the industrial controller.

13. The method of claim 8, wherein the industrial controller comprises an industrial controller of a gasification system, a gas treatment system, a turbine system, a power generation system, a heat recovery steam generation (HRSG) system, or a combination thereof.

14. A tangible, non-transitory, computer-readable medium comprising instructions configured to be executed by a processor of an industrial controller, the instructions comprising:
    instructions to determine an encryption key value via execution of a first binary file of a plurality of binary files, wherein the first binary file was generated from a source file having the encryption key value embedded within;
    instructions to use the determined encryption key value to decrypt a whitelist file, wherein the whitelist file comprises a plurality of whitelisted hash key values that respectively correspond to the plurality of binary files;
    instructions to determine a hash key value for a second binary file of the plurality of binary files; and
    instructions to block execution of the second binary file when the determined hash key value is not located among the plurality of whitelisted hash key values.

15. The medium of claim 14, wherein the instructions comprise instructions to log information relating to the particular binary file blocked from executing on the industrial controller.

16. The medium of claim 14, wherein the instructions comprise instructions to allow execution of the second binary file when the determined hash key value is located among the plurality of whitelisted hash key values.

17. The medium of claim 14, wherein the instructions comprise instructions to determine the hash key value for the particular binary file using a Cyclic Redundancy Check (CRC) hash function, a Message-Digest Algorithm (MD) hash function, or a Secure Hash Algorithm (SHA) hash function.

18. The medium of claim 14, wherein the instructions comprise instructions to unpackage a package generated by a build system processor, wherein the package comprises the plurality of binary files and the whitelist file.

19. The system of claim 1, wherein the build system processor is configured to package the encrypted whitelist file and the plurality of binary files together in a package before the package is provided to the industrial controller.

20. The system of claim 19, wherein the build system processor is configured to compress the package before the package is provided to the industrial controller.

* * * * *

UNITED STATES PATENT AND TRADEMARK OFFICE
CERTIFICATE OF CORRECTION

PATENT NO. : 8,964,973 B2
APPLICATION NO. : 13/460801
DATED : February 24, 2015
INVENTOR(S) : Justin Brandon Chong et al.

It is certified that error appears in the above-identified patent and that said Letters Patent is hereby corrected as shown below:

On the Title Page, Item (75) Inventors: "Justin Brandon Chong, Salem, VA (US); David Richard Socky, Roanoke, VA (US); Manas Ranjan Sahoo, Hyderabad, (IN)" should read --Justin Brandon Chong, Salem, VA (US); William Robert Pettigrew, Salem, VA (US); Manas Ranjan Sahoo, Hyderabad (IN)--.

Signed and Sealed this
Twenty-first Day of July, 2015

Michelle K. Lee
*Director of the United States Patent and Trademark Office*

UNITED STATES PATENT AND TRADEMARK OFFICE
CERTIFICATE OF CORRECTION

PATENT NO. : 8,964,973 B2  
APPLICATION NO. : 13/460801  
DATED : February 24, 2015  
INVENTOR(S) : Chong et al.

Page 1 of 1

It is certified that error appears in the above-identified patent and that said Letters Patent is hereby corrected as shown below:

Drawings

In FIG. 4, Sheet 3 of 3, for block 86, in Line 2, delete "WHIELIST" and insert -- WHITELIST --, therefor.

Specification

In Column 7, Line 30, delete "processor 34" and insert -- processor 36 --, therefor.

Signed and Sealed this  
Twenty-fourth Day of November, 2015

Michelle K. Lee  
*Director of the United States Patent and Trademark Office*